United States Patent
Evulet et al.

(10) Patent No.: US 7,874,157 B2
(45) Date of Patent: Jan. 25, 2011

(54) COANDA PILOT NOZZLE FOR LOW EMISSION COMBUSTORS

(75) Inventors: Andrei Tristan Evulet, Clifton Park, NY (US); Balachandar Varatharajan, Cincinnati, OH (US); Gilbert Otto Kraemer, Greer, SC (US); Ahmed Mostafa ElKady, Niskayuna, NY (US); Benjamin Paul Lacy, Greer, SC (US)

(73) Assignee: General Electric Company, Niskayuna, NY (US)

( * ) Notice: Subject to any disclaimer, the term of this patent is extended or adjusted under 35 U.S.C. 154(b) by 476 days.

(21) Appl. No.: 12/133,455

(22) Filed: Jun. 5, 2008

(65) Prior Publication Data

US 2009/0314000 A1    Dec. 24, 2009

(51) Int. Cl.
*F02C 1/00* (2006.01)
*F02G 3/00* (2006.01)

(52) U.S. Cl. .......................... 60/740; 60/746
(58) Field of Classification Search ............ 60/737, 60/748, 740, 742, 746, 747, 752
See application file for complete search history.

(56) References Cited

U.S. PATENT DOCUMENTS

| | | | | |
|---|---|---|---|---|
| 2,948,117 A | * | 8/1960 | Nerad et al. ................. 60/746 |
| 3,143,401 A | * | 8/1964 | Lambrecht ................. 48/180.1 |
| 3,792,582 A | * | 2/1974 | Markowski ................. 60/737 |
| 3,876,362 A | | 4/1975 | Hirose |
| 4,199,934 A | * | 4/1980 | Meyer ................. 60/39.23 |
| 5,251,447 A | * | 10/1993 | Joshi et al. ................. 60/737 |
| 5,285,635 A | * | 2/1994 | Savelli et al. ................. 60/804 |
| 5,329,761 A | * | 7/1994 | Ablett et al. ................. 60/804 |
| 5,351,477 A | * | 10/1994 | Joshi et al. ................. 60/39.463 |
| 5,680,766 A | * | 10/1997 | Joshi et al. ................. 60/746 |
| 5,778,676 A | * | 7/1998 | Joshi et al. ................. 60/746 |
| 5,802,854 A | | 9/1998 | Maeda et al. |
| 5,816,049 A | * | 10/1998 | Joshi ................. 60/737 |
| 5,865,024 A | * | 2/1999 | Kress et al. ................. 60/39.463 |

(Continued)

FOREIGN PATENT DOCUMENTS

EP    0106659 A2    4/1984

(Continued)

*Primary Examiner*—William H Rodríguez
(74) *Attorney, Agent, or Firm*—Patrick K. Patnode

(57) ABSTRACT

A low emission combustor includes a combustor housing defining a combustion chamber. A secondary nozzle is disposed along a centerline of the combustion chamber and configured to inject air or a first mixture of air and fuel on a downstream side of the combustion chamber. The secondary nozzle includes an air inlet configured to introduce a first fluid including air, a diluent, or combinations thereof into the secondary nozzle. At least one fuel plenum is configured to introduce a second fluid including a fuel, another diluent, or combinations thereof into the secondary nozzle and over a predetermined profile proximate to the fuel plenum. The predetermined profile is configured to facilitate attachment of the second fluid to the profile to form a fluid boundary layer and to entrain incoming first fluid through the fluid boundary layer to promote mixing of the first fluid and the second fluid and fuel to produce the first fluid. A plurality of primary fuel nozzles are disposed proximate on an upstream side of the combustion chamber and located around the secondary nozzle and configured to inject air or a second mixture of air and fuel to an upstream side of the combustion chamber.

24 Claims, 4 Drawing Sheets

U.S. PATENT DOCUMENTS

| | | | |
|---|---|---|---|
| 6,301,900 B1 * | 10/2001 | Mandai et al. | 60/740 |
| 6,418,726 B1 * | 7/2002 | Foust et al. | 60/776 |
| 6,508,061 B2 * | 1/2003 | Stuttaford | 60/804 |
| 6,874,323 B2 | 4/2005 | Stuttaford | |
| 7,155,913 B2 * | 1/2007 | Beule et al. | 60/804 |
| 7,237,384 B2 * | 7/2007 | Stuttaford et al. | 60/776 |
| 7,434,401 B2 * | 10/2008 | Hayashi | 60/743 |
| 7,506,496 B2 * | 3/2009 | Mantchenkov et al. | 60/39.461 |
| 2002/0184893 A1 * | 12/2002 | Farmer et al. | 60/804 |
| 2008/0078182 A1 * | 4/2008 | Evulet | 60/776 |
| 2008/0104961 A1 * | 5/2008 | Bunker | 60/737 |

FOREIGN PATENT DOCUMENTS

WO    01/35022  A1    5/2001

* cited by examiner

COANDA PILOT NOZZLE FOR LOW EMISSION COMBUSTORS

BACKGROUND

The invention relates generally to combustors, and more particularly to a coanda pilot nozzle for low emission combustion devices.

A gas turbine employed in, for example, a gas turbine plant or a combined cycle plant is operated to achieve higher operational efficiency under higher temperature and higher pressure conditions, and this tends to increase emissions (NOx) in an exhaust gas stream. Although various factors for generation of NOx are known, the dominant one is flame temperature.

There are some conventional techniques for reducing NOx in an exhaust gas stream. One conventionally adopted method involves injection of steam or water into the high-temperature combustion area in a combustor for reducing the flame temperature during the combustion. Although this method is easy to carry out, it suffers from a problem that a large amount of steam or water is required. As a result, plant efficiency may be reduced. Moreover, injection of a large amount of steam or water into the combustor increases combustion vibrations and partial combustion products.

Taking the above defects into consideration, a dry type premixed multi-stage lean combustion method has been developed, in which fuel and combustion air are premixed and burned under lean fuel conditions. In this premixed multi-stage lean combustion technique, a flame structure which provides a diffusion combustion flame is used to ensure stable combustion over a wide fuel-air ratio range. While improving the dynamics, and operability of the combustor, such a technique tends to generate higher NOx due to local hot spots in the flame. The NOx emission levels become larger, since NOx emissions are directly proportional to the flame temperature.

Accordingly there is a need for a system that is employed in gas turbines that achieves reduced NOx emissions from the combustor without compromising the dynamics and operability of the combustor.

BRIEF DESCRIPTION

In accordance with one exemplary embodiment of the present invention, a low emission combustor includes a combustor housing defining a combustion chamber. A secondary nozzle is disposed along a centerline of the combustion chamber and configured to inject air or a first mixture of air and fuel to a downstream side of the combustion chamber. The secondary nozzle includes an air inlet configured to introduce air into the secondary nozzle. At least one fuel plenum is configured to introduce fuel into the secondary nozzle and over a predetermined profile proximate to the fuel plenum. The predetermined profile is configured to facilitate attachment of the fuel to the profile to form a fuel boundary layer and to entrain incoming air through the fuel boundary layer to promote mixing of air and fuel to produce the first mixture of air and fuel. In certain embodiments, air, diluents, or combinations thereof may be introduced through the air inlet. In some embodiments, the fuel plenum is configured to introduce fuel, diluents, or combinations thereof into the secondary nozzle and over the predetermined profile proximate to the fuel plenum. A plurality of primary fuel nozzles are disposed proximate to an upstream side of the combustion chamber and located around the secondary nozzle and configured to inject air or a second mixture of air and fuel to an upstream side of the combustion chamber. Typically, the amount of the first mixture of air and fuel is less than the second mixture of air and fuel.

In accordance with another exemplary embodiment, a gas turbine having a low emission combustor is disclosed.

In accordance with another exemplary embodiment, a low emission combustor includes a combustor housing defining a combustion chamber. A coanda secondary nozzle is disposed along a centerline of the combustion chamber and configured to inject a first mixture of air and fuel to a downstream side of the combustion chamber when fuel is supplied to the secondary nozzle. The coanda secondary nozzle is configured to inject air to the downstream side of the combustion chamber when fuel is not supplied to the secondary nozzle. A plurality of primary fuel nozzles disposed proximate to an upstream side of the combustion chamber and located around the secondary nozzle and configured to inject a second mixture of air and fuel to an upstream side of the combustion chamber.

In accordance with another exemplary embodiment, a method of combustion in a low emission combustor is disclosed.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
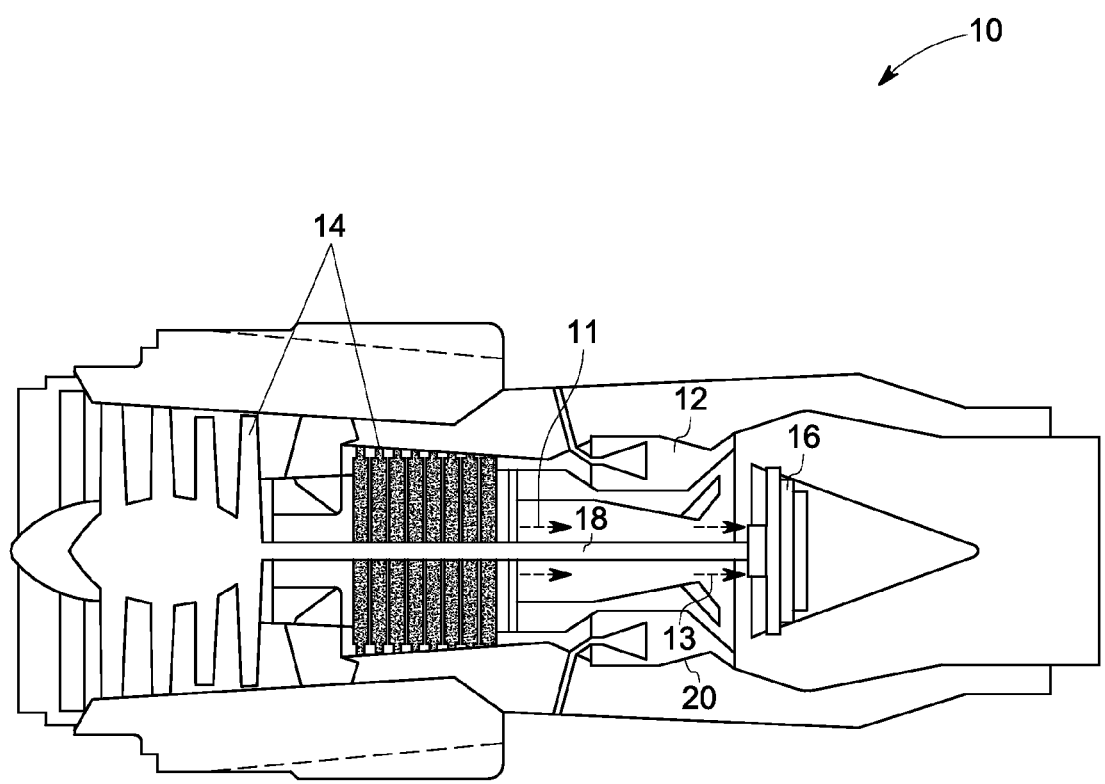
FIG. 1 is a diagrammatical illustration of a gas turbine having a combustor with a secondary nozzle in accordance with an exemplary embodiment of the present invention.

As discussed in detail below, certain embodiments of the present invention disclose a low emission combustor having a combustor housing defining a combustion chamber. A secondary nozzle is disposed along a center line of the combustion chamber and configured to inject air or a first mixture of air and fuel (also referred to as "pilot injection") to a downstream side of the combustion chamber. The secondary nozzle includes an air inlet configured to introduce air into the secondary nozzle. At least one fuel plenum is configured to introduce fuel into the secondary nozzle and direct the fuel over a predetermined profile disposed proximate to the fuel plenum. The predetermined profile is configured to facilitate attachment of the fuel to the profile to form a fuel boundary layer and to entrain incoming air through the fuel boundary layer to promote mixing of the air and fuel. In certain embodiments, air, diluents, or combinations thereof may be introduced through the air inlet. In certain embodiments, the fuel plenum is configured to introduce fuel, diluents, or combinations thereof into the secondary nozzle and over the predetermined profile proximate to the fuel plenum. In some embodiments, a plurality of plenums may be configured to permit injection of different fuels and/or diluents. A plurality of primary nozzles are disposed proximate to an upstream side of the combustion chamber and located around the secondary nozzle and configured to inject air or a second mixture of air and fuel (also referred to as "main injection") to an upstream side of the combustion chamber. The amount of the first mixture of air and fuel is typically less than the second mixture of air and fuel. It should be noted herein that in the embodiments discussed below, air may include a first fluid including air, one or more diluents, or combinations thereof and fuel may include a second fluid including fuel, one or more diluents, or combinations thereof. In certain embodiments, the predetermined profile is configured to facilitate attachment of the second fluid to the profile to form a fluid boundary layer and to entrain the incoming first fluid through the fluid boundary layer to promote premixing of the first fluid and the second fluid to produce a first fluid mixture.

In accordance with another exemplary embodiment of the present invention, a gas turbine having a low emission combustor is disclosed. In accordance with another exemplary embodiment of the present invention, a method of combustion using a low emission combustor is disclosed. The secondary nozzles (also referred to as "pilot nozzles") operate in variable premix mode based on the fuel supply to the secondary nozzles. The secondary nozzle includes a coanda device used to mix the fuel and air. The secondary nozzle injects only air if fuel is not supplied to the secondary nozzle. This results in a minimization of the local hot spots in the pilot injection area of combustors. As a consequence, NOx emissions are reduced.

As discussed in detail below, embodiments of the present technique function to reduce emissions in combustion processes in various applications such as in ground power gas turbine combustors, gas ranges and internal combustion engines. In particular, the present technique employs a pilot nozzle having a coanda device upstream of a combustion area for enhancing the mixing of air and a gaseous fuel prior to combustion in the combustion area. Turning now to drawings and referring first to FIG. 1, a gas turbine 10 having a low emission combustor 12 is illustrated. The gas turbine 10 includes a compressor 14 configured to compress ambient air. The combustor 12 is in flow communication with the compressor 14 and is configured to receive compressed air 11 from the compressor 14 and to combust a fuel stream to generate a combustor exit gas stream 13. In one embodiment, the combustor 12 includes a can combustor. In an alternate embodiment, the combustor 12 includes a can-annular combustor or a purely annular combustor. In addition, the gas turbine 10 includes a turbine 16 located downstream of the combustor 12. The turbine 16 is configured to expand the combustor exit gas stream 13 to drive an external load. In the illustrated embodiment, the compressor 14 is driven by the power generated by the turbine 16 via a shaft 18.

In the illustrated embodiment, the combustor 12 includes a combustor housing 20 defining a combustion area. In addition, the combustor 12 includes a coanda pilot nozzle configured for mixing compressed air and a fuel stream and injecting a mixture of air and fuel prior to combustion into the combustion area. In particular, the premixing device employs a coanda effect to enhance the mixing efficiency of the device that will be described below with reference to subsequent figures. As used herein, the term "coanda effect" refers to the tendency of a stream of fluid to attach itself to a nearby surface and to remain attached even when the surface curves away from the original direction of fluid motion.

Figure 2:
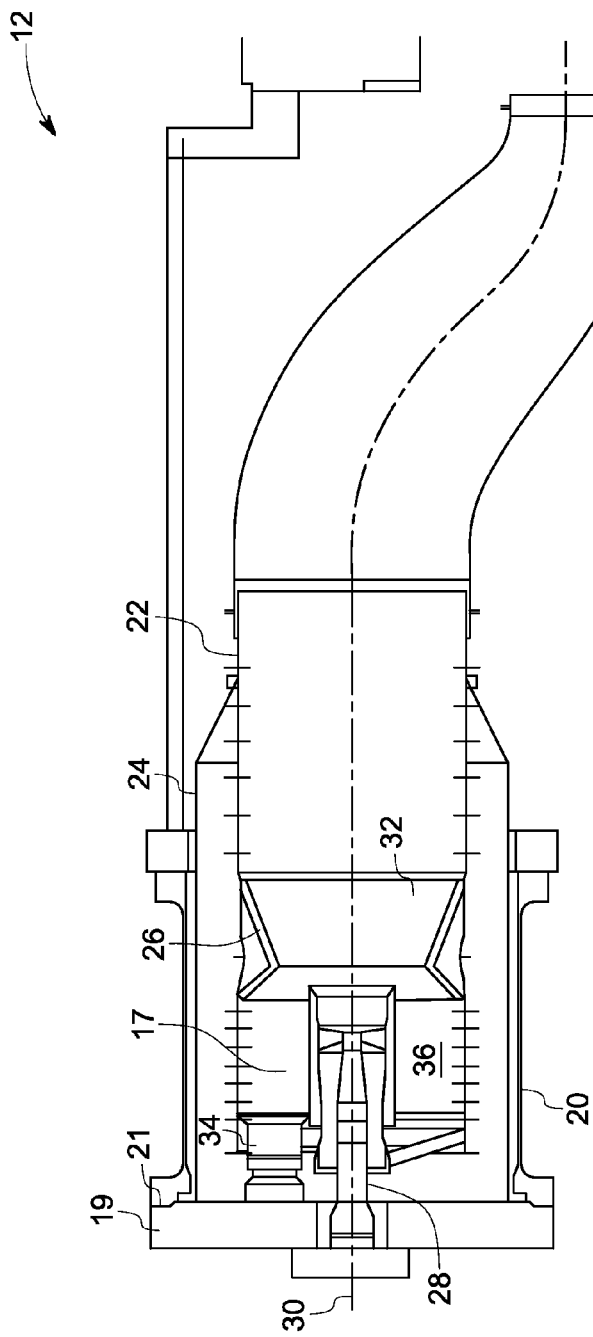
FIG. 2 is a diagrammatical illustration of a combustor having a secondary nozzle in accordance with an exemplary embodiment of the present invention.

Referring to FIG. 2, a low emission combustor 12 in accordance with the aspects of FIG. 1 is illustrated. The combustor 12 may be a can combustor, a can-annular combustor, or an annular combustor. The exemplary combustor 12 includes a combustor housing 20 defining a combustion chamber 17. A cover assembly 19 is provided on one end 21 of the combustor housing 14. A combustion liner 22 is disposed within a flow sleeve 24 provided in the combustor housing 20. A venturi assembly 26 is disposed inside the combustion liner 22.

A secondary nozzle 28 (also referred to as "pilot nozzle") is disposed aligned with a centerline 30 of the combustion chamber 17. The secondary nozzle 28 is configured to mix air and the fuel and inject a first mixture (also referred to as "pilot mixture") of air and fuel to a downstream combustion zone 32 of the combustion chamber 17. In certain embodiments, the fuel may include hydrocarbons, natural gas, or high hydrogen gas, or hydrogen, or biogas, or carbon monoxide, or syngas along with predetermined amount of diluents. Diluents may include nitrogen, carbon dioxide, water, steam, or the like. In the illustrated embodiment the secondary nozzle 28 is a coanda type nozzle. Details of the secondary nozzle are explained in greater detail with reference to subsequent figures. A plurality of primary nozzles 34 are disposed on an upstream side of the combustion chamber 17 and located around the secondary nozzle 28 and configured to inject a second mixture (also referred to as "main mixture") of air and fuel to an upstream combustion zone 36 of the combustion chamber 17. In one embodiment, the primary nozzle 34 may be a coanda nozzle. It should be noted herein that the amount of first mixture of air and fuel is less than the amount of second mixture of air and fuel. The fuel is uniformly distributed in the combustion chamber and the air utilization within the combustion chamber is enhanced. Smaller quantity of pilot injection facilitates prevention of adherence of fuel to cylinder walls. As a result, the exhaust gas emission is substantially controlled and the specific fuel consumption is reduced.

In some embodiments, the fuel may include liquid fuels. In some embodiments, when liquid fuels are used, the liquid fuel is premixed with inert gas such as steam, nitrogen, or air and preheated to a vapor phase. The vaporized fuel is then mixed with the combustion air in the coanda nozzle.

Nitrogen oxide (NOx) generation from combustion turbines is a function of temperature and residence time. Higher combustion temperatures cause a decomposition of atmospheric nitrogen into single atoms that then react with oxygen to form NOx. NOx generation increases rapidly as combustion temperatures increase beyond a threshold temperature. Average temperatures in combustion turbines are typically lower than this threshold temperature, but certain regions within the combustor may be hotter, resulting in generation of NOx. Carbon monoxide (CO) may be generated due to incomplete combustion. Factors that influence CO formation may include improper air-fuel ratios, and inadequate fuel-air mixing. In addition to generating CO, these factors lower combustion temperatures and reduce the efficiency of the machine. It is known that combustor design has a significant impact on emissions, particularly with regard to formation of NOx and CO. Higher combustion temperatures improve turbine efficiency and reduce CO generation, but increases NOx generation. It is vise versa for lower combustion temperatures. In one conventional technique, water is injected into the turbine for reducing emissions. However, this technique is not capable of reducing NOx emissions within predefined limits.

In another conventional technique, selective catalytic reduction is employed at a post combustion stage. This technique is complex and expensive.

In the illustrated embodiment, the combustor 12 is operated in a premix mode. Fuel feed is split between the primary 34 and the secondary nozzles 28. Flame resides completely within the downstream combustion zone 32 of the combustion chamber 16. The venturi assembly 26 enhances fuel-air mixing during the premix mode for the fluids entering the downstream combustion zone 32. The venturi assembly 26 creates a sudden expansion and strong recirculation region. This improves combustion stability and mixing. The venturi assembly 26 is cooled by diverting a portion of the inlet air to the venturi assembly 26. In accordance with the exemplary embodiment, usage of the primary 34 and the secondary nozzles 28 facilitates flexible fuel feed during load change and off-peak operation of the machine. The coanda type nozzles enhance combustion efficiency and minimize flashback. The airflow design lowers peak flame temperature and enhances cooling of combustor components.

Figure 3:
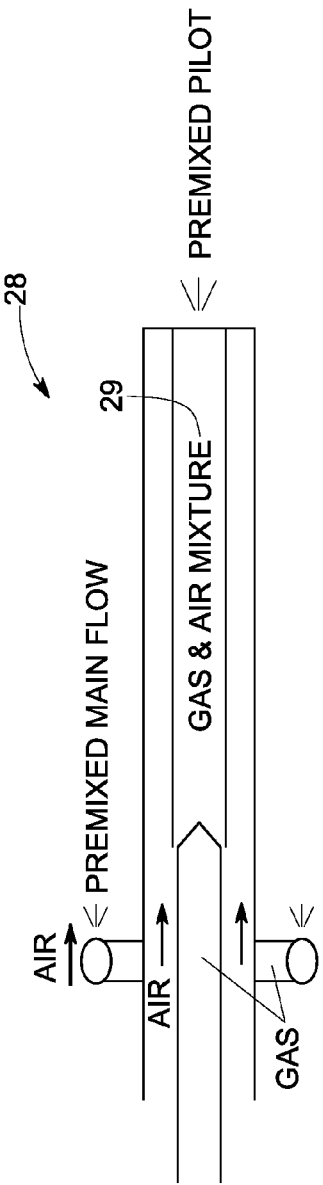
FIG. 3 is a diagrammatical view of a secondary nozzle in accordance with an exemplary embodiment of the present invention.

Referring to FIG. 3, a secondary nozzle 28 in accordance with an exemplary embodiment of the present invention is illustrated. As discussed previously, the secondary nozzle 28 is disposed aligned with the centerline of the combustion chamber. The secondary nozzle 28 is configured to mix air and the fuel and inject a first mixture 29 (also referred to as "pilot mixture") of air and fuel to a downstream combustion zone of the combustion chamber. The illustrated figure shows air and the gaseous fuel mixed in the secondary nozzle 28.

It is conventionally known to use a diffusion flame or pilot injection for the purpose of stabilization of flame in the combustion chamber. Even though the dynamics and operability of the combustor may be enhanced by adopting this technique, larger amounts of NOx and soot emissions, and incomplete combustion products are generated due to local hot spots in the flame. In accordance with the exemplary embodiments of the present invention, air and fuel are mixed to provide the first mixture 29 of air and fuel as pilot fuel injection prior to combustion. The pressure drop during the pilot injection is minimized. In one embodiment, the secondary nozzle 28 provides a premixed pilot injection when fuel is supplied to the secondary nozzle 28. When fuel is not supplied to the secondary nozzle 28, the secondary nozzle 28 injects only air. In other words, the nozzle 28 acts a dilution source during certain operating conditions. The premixed pilot injection from the secondary nozzle 28 may be provided depending on the operating conditions. As a result, operability and dynamics of the combustor are improved and NOx generation is lowered due to minimization of local hot spots in the combustor.

Figure 4:
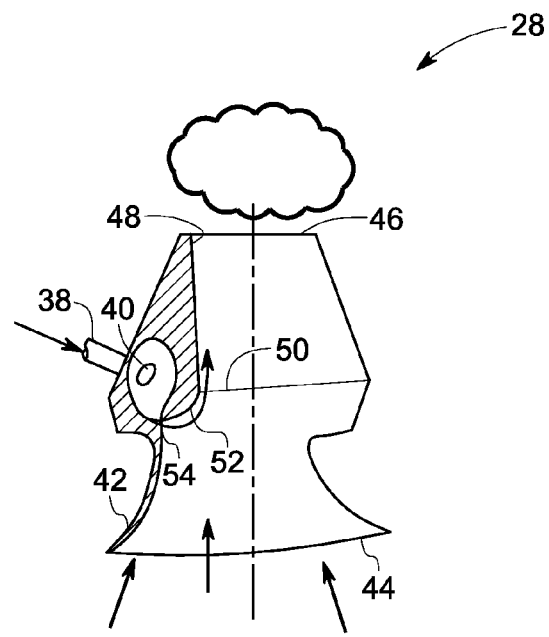
FIG. 4 is a diagrammatical illustration of a secondary nozzle in accordance with an exemplary embodiment of the present invention.

FIG. 4 is a diagrammatical illustration of an exemplary configuration of the secondary nozzle 28 employed in the combustors of FIGS. 2 and 3. In the embodiment, illustrated in FIG. 4 the secondary nozzle 28 includes a fuel line 38 for directing the fuel inside a fuel plenum 40 of the secondary nozzle 28. An air inlet nozzle profile of the secondary nozzle 28 and an air inlet are represented by reference numerals 42 and 44. In addition, the nozzle 28 includes a nozzle outlet 46, a diffuser wall 48 and a throat area 50. The nozzle 28 receives the fuel from the fuel plenum 40 and the fuel is directed to flow over a pre-determined profile 52 or over a set of slots or orifices through a fuel outlet annulus 54. Subsequently, the fuel is mixed with incoming air from the air inlet 44 to form a fuel-air mixture. The degree of premixing is controlled by a fuel type, or geometry of the profile, or a fuel pressure, or temperature of the fuel, or temperature of the air, or length of premixing, or a fuel injection velocity, or combinations thereof. In some embodiments, a plurality of plenums 40 or fuel slots/orifices could be utilized to inject different combinations of fuel and/or diluents.

Figure 5:
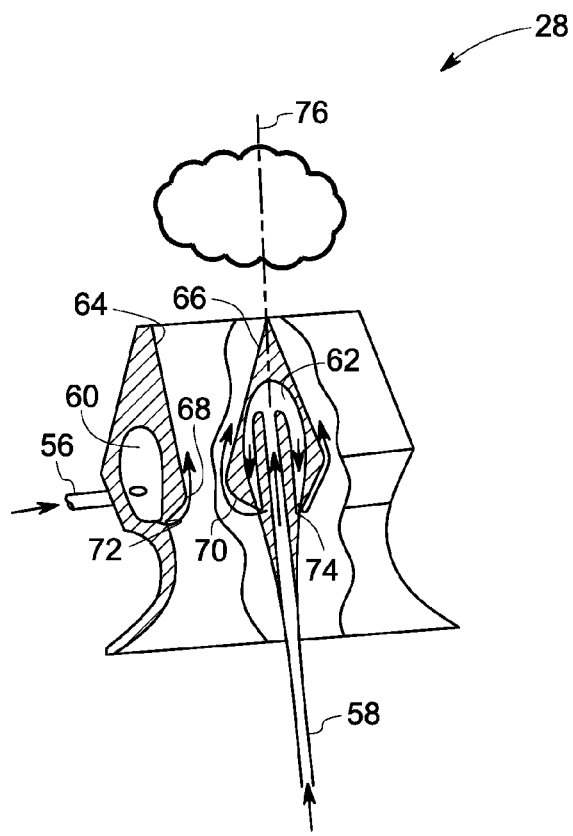
FIG. 5 is a diagrammatical illustration of a secondary nozzle in accordance with an exemplary embodiment of the present invention.

FIG. 5 is a diagrammatical illustration of another exemplary configuration of the secondary nozzle 28 employed in the combustors of FIGS. 2 and 3, for substantially larger air flows and fuel staging capabilities. In the embodiment illustrated in FIG. 5, the secondary nozzle 28 includes a dual-mixing configuration nozzle that facilitates wall and center mixing. The secondary nozzle 28 includes two fuel inlet lines 56 and 58 and two fuel plenums 60 and 62 to independently provide the fuel for wall and center mixing. Further, a diffuser wall and a center body are represented by reference numerals 64 and 66 respectively. The fuel from the fuel plenums 60 and 62 is directed to flow over the pre-determined profiles 68 and 70 via two fuel outlets 72 and 74. The secondary nozzle 28 receives an airflow along a centerline 76 of the nozzle 28 and facilitates mixing of the air and fuel within the nozzle 28. The pre-determined profiles 68 and 70 may be designed to facilitate the mixing within the premixing device based on the coanda effect. In the illustrated embodiment, the pre-determined profiles 68 and 70 facilitate attachment of the introduced fuel to the profiles 68 and 70 to form a fuel boundary layer. Additionally, the fuel boundary layer formed adjacent the pre-determined profiles 68 and 70 facilitates air entrainment thereby enhancing the mixing efficiency of the secondary nozzle 28. The coanda effect generated within the secondary nozzle 28 facilitates a relatively high degree of premixing prior to combustion thereby substantially reducing pollutant emissions from the combustion system. In particular, the ability of the fuel to attach to the profiles 68 and 70 due to the coanda effect and subsequent air entrainment results in a relatively high pre-mixing efficiency of the nozzle 28 before combustion.

Figure 6:
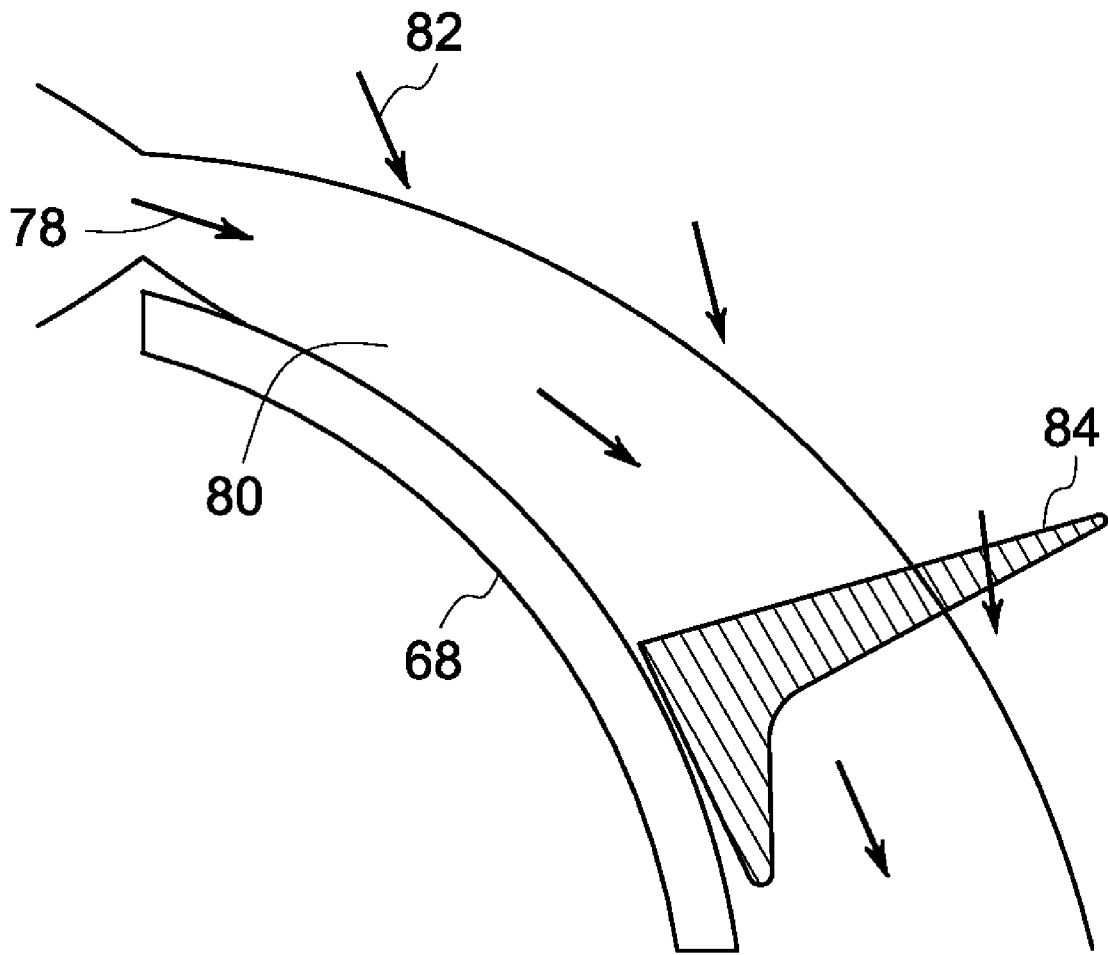
FIG. 6 is a diagrammatical illustration of the formation of fuel boundary layer adjacent a profile in a secondary nozzle based upon a coanda effect in accordance with an exemplary embodiment of the present invention.

FIG. 6 is a diagrammatical illustration of the formation of a fuel boundary layer adjacent the profile 68 in the secondary nozzle 28 of FIG. 5 based upon the coanda effect. In the illustrated embodiment, a fuel flow 78 attaches to the profile 68 and remains attached even when the surface of the profile 68 curves away from the initial fuel flow direction. More specifically, as the fuel flow 78 accelerates to balance the momentum transfer, there is a pressure difference across the flow, which deflects the fuel flow 78 closer to the surface of the profile 68. As will be appreciated by one skilled in the art, as the fuel 78 moves across the profile 68, a certain amount of skin friction occurs between the fuel flow 78 and the profile 68. This resistance to the flow deflects the fuel 78 towards the profile 68 thereby causing it to stick to the profile 68. Further, a fuel boundary layer 80 formed by this mechanism entrains an incoming airflow 82 to form a shear layer 84 with the fuel boundary layer 80 to promote mixing of the airflow 82 and the fuel 78. Furthermore, the shear layer 84 formed by the detachment and mixing of the fuel boundary layer 80 with the entrained air 82 results in a uniform mixture.

More details pertaining to coanda devices are explained in greater detail with reference to U.S. application Ser. No. 11/273,212 incorporated herein by reference. The various aspects of the secondary nozzle 28 described hereinabove have utility in different applications such as combustors employed in gas turbines and heating devices such as furnaces. In addition, the nozzles 28 may be employed in gas range appliances. In certain embodiments, the nozzles 28 may be employed in aircraft engine hydrogen combustors and other gas turbine combustors for aero-derivatives and heavy-duty machines.

Thus, the premixing technique based upon the coanda effect described above enables enhanced premixing and flame stabilization in a combustor. Further, the present technique enables reduction of emissions, particularly NOx emissions from such combustors thereby facilitating the operation of the gas turbine in an environmentally friendly manner. In certain embodiments, this technique facilitates minimization of pressure drop across the combustors, more particularly in hydrogen combustors. In addition, the enhanced premixing achieved through the coanda effect facilitates enhanced turndown, flashback resistance and increased flameout margin for the combustors.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A low emission combustor, comprising:
 a combustor housing defining a combustion chamber;
 a secondary nozzle disposed along a center line of the combustion chamber and configured to inject air or a first mixture of air and fuel to a downstream side of the combustion chamber; wherein the secondary nozzle comprises:
 an air inlet configured to introduce a first fluid comprising air, a diluent, or combinations thereof into the secondary nozzle;
 at least one fuel plenum configured to introduce a second fluid comprising a fuel, another diluent, or combinations thereof into the secondary nozzle and over a predetermined profile disposed proximate to the fuel plenum, wherein the predetermined profile is configured to facilitate attachment of the second fluid to the profile to form a fluid boundary layer and to entrain the incoming first fluid through the fluid boundary layer to promote premixing of the first fluid and the second fluid to produce a first fluid mixture;
 a plurality of primary nozzles disposed proximate to an upstream side of the combustion chamber and located around the secondary nozzle and configured to inject air or a second mixture of air and fuel to an upstream side of the combustion chamber; wherein an amount of first fluid mixture is less than the second mixture of air and fuel wherein the plurality of primary nozzles comprises a plurality of coanda nozzles.

2. The combustor of claim 1, wherein the predetermined profile deflects the supplied second fluid towards the profile via a coanda effect.

3. The combustor of claim 1, wherein the first fluid supplied through the air inlet forms a shear layer with the fluid boundary layer to facilitate premixing of the first fluid and the second fluid and to substantially reduce pollutant emissions.

4. The combustor of claim 1, wherein a degree of premixing is controlled by a fuel type, or a geometry of the predetermined profile, or a fuel pressure, or a temperature of the fuel, or a temperature of the air, or a length of premixing, or a fuel injection velocity, or combinations thereof.

5. The combustor of claim 1, wherein the combustor comprises a can combustor, or a can-annular combustor, or an annular combustor.

6. The combustor of claim 1, wherein the fuel comprises natural gas, or, hydrocarbons, or high hydrogen gas, or hydrogen, or bio gas, or carbon monoxide, or syngas.

7. The combustor of claim 1, wherein the secondary nozzle is configured to inject the first fluid mixture to a downstream side of the combustion chamber when the second fluid is supplied to the secondary nozzle.

8. The combustor of claim 7, wherein the secondary nozzle is configured to inject the first fluid to the downstream side of the combustion chamber when the second fluid is not supplied to the secondary nozzle.

9. A gas turbine, comprising:
 a compressor configured to compress ambient air;
 a combustor in flow communication with the compressor, the combustor being configured to receive compressed air from the compressor and to combust a fuel stream to generate a combustor exit gas stream; the combustor comprising:
 a combustor housing defining a combustion chamber;
 a secondary nozzle disposed along a center line of the combustion chamber and configured to inject air or a first mixture of air and fuel to a downstream side of the combustion chamber; wherein the secondary nozzle comprises:
 an air inlet configured to introduce air into the secondary nozzle;
 at least one fuel plenum configured to introduce fuel into the secondary nozzle and over a predetermined profile disposed proximate to the fuel plenum, wherein the predetermined profile is configured to facilitate attachment of the fuel to the profile to form a fuel boundary layer and to entrain incoming air through the fuel boundary layer to promote premixing of air and fuel to produce the first mixture of air and fuel;
 a plurality of primary nozzles disposed proximate to an upstream side of the combustion chamber and located around the secondary nozzle and configured to inject air or a second mixture of air and fuel to an upstream side of the combustion chamber; wherein an amount of first mixture of air and fuel is less than the second mixture of air and fuel, wherein the plurality of primary nozzles comprises a plurality of coanda nozzles.

10. The gas turbine of claim 9, wherein the air supplied through the air inlet forms a shear layer with the fuel boundary layer to facilitate premixing of air and fuel and to substantially reduce pollutant emissions.

11. The gas turbine of claim 10, wherein the secondary nozzle is configured to inject the first mixture of air and fuel to a downstream side of the combustion chamber when fuel is supplied to the secondary nozzle.

12. The gas turbine of claim 11, wherein the secondary nozzle is configured to inject air to the downstream side of the combustion chamber when fuel is not supplied to the secondary nozzle.

13. A low emission combustor, comprising:
 a combustor housing defining a combustion chamber;
 a coanda secondary nozzle disposed along a center line of the combustion chamber and configured to inject a first mixture of air and fuel to a downstream side of the combustion chamber when fuel is supplied to the secondary nozzle; or to inject air to the downstream side of the combustion chamber when fuel is not supplied to the secondary nozzle;
 a plurality of primary nozzles disposed proximate to an upstream side of the combustion chamber and located around the secondary nozzle and configured to inject air or a second mixture of air and fuel to an upstream side of the combustion chamber, wherein the plurality of primary nozzles comprises a plurality of coanda nozzles.

14. The combustor of claim 13, wherein the coanda secondary nozzle comprises an air inlet configured to introduce air into the secondary nozzle.

15. The combustor of claim 14, wherein the coanda secondary nozzle comprises at least one fuel plenum configured to introduce fuel into secondary the nozzle.

16. The combustor of claim 15, wherein the coanda secondary nozzle is configured to introduce fuel over a predetermined profile disposed proximate to the fuel plenum, wherein the predetermined profile is configured to facilitate attachment of the fuel to the profile to form a fuel boundary layer and to entrain incoming air through the fuel boundary layer to promote premixing of air and fuel to produce the first mixture of air and fuel.

17. The combustor of claim 16, wherein the air supplied through the air inlet forms a shear layer with the fuel boundary layer to facilitate premixing of air and fuel and to substantially reduce pollutant emissions.

18. A method of combustion, comprising:
  introducing a first fluid comprising air, a diluent, or combinations thereof via an air inlet into a secondary nozzle disposed along a center line of a combustion chamber;
  introducing a second fluid comprising a fuel, another diluent, or combinations thereof via a fuel plenum into the secondary nozzle;
  deflecting the introduced second fluid towards a predetermined profile within the secondary nozzle to form a fluid boundary layer;
  entraining the introduced first fluid through the fluid boundary layer to facilitate mixing of the first fluid and the second fluid to form a first fluid mixture;
  injecting the first fluid mixture to a downstream side of the combustion chamber via the secondary nozzle;
  injecting a second mixture of air and fuel via a plurality of primary nozzles disposed proximate to an upstream side of the combustion chamber and located around the secondary nozzle, wherein the plurality of primary nozzles comprises coanda nozzles.

19. The method of claim 18, comprising deflecting the supplied second fluid towards the predetermined profile via a coanda effect.

20. The method of claim 18, comprising forming a shear layer with the fluid boundary layer to facilitate premixing of the first and second fluids and to substantially reduce pollutant emissions.

21. A method of combustion, comprising:
  injecting a first fluid mixture comprising a first fluid and a second fluid to a downstream side of the combustion chamber via a coanda secondary nozzle disposed along a center line of the combustion chamber when the second fluid is supplied to the secondary nozzle; or to inject the first fluid to the downstream side of the combustion chamber when the second fluid is not supplied to the secondary nozzle; wherein the first fluid comprises air, a diluent, or combinations thereof; wherein the second fluid comprises a fuel, another diluent, or combinations thereof;
  injecting a second mixture of air and fuel to an upstream side of the combustion chamber via a plurality of primary nozzles disposed proximate to an upstream side of the combustion chamber and located around the secondary nozzle, wherein the plurality of primary nozzles comprises coanda nozzles.

22. The method of claim 21, comprising introducing the first fluid via an air inlet into the secondary nozzle.

23. The method of claim 22, comprising introducing the second fluid via a fuel plenum into the secondary the nozzle.

24. The method of claim 22, comprising deflecting the supplied second fluid towards a predetermined profile of the secondary nozzle via a coanda effect.

* * * * *

UNITED STATES PATENT AND TRADEMARK OFFICE
CERTIFICATE OF CORRECTION

PATENT NO. : 7,874,157 B2  
APPLICATION NO. : 12/133455  
DATED : January 25, 2011  
INVENTOR(S) : Evulet et al.

Page 1 of 1

It is certified that error appears in the above-identified patent and that said Letters Patent is hereby corrected as shown below:

In Column 1, under the Title, insert -- This invention was made with Government support under Contract No. DE-FC26-05NT42643, awarded by the US Department of Energy (DOE). The Government has certain rights in this invention. --.

In Column 9, Line 3, in Claim 15, delete "secondary the nozzle." and insert -- the secondary nozzle. --, therefor.

In Column 10, Line 2, in Claim 23, delete "secondary the nozzle." and insert -- secondary nozzle. --, therefor.

Signed and Sealed this
Fourteenth Day of June, 2011

David J. Kappos
*Director of the United States Patent and Trademark Office*